(No Model.) 2 Sheets—Sheet 1.
O. PAGAN.
CLAPPER OR RATTLER DEVICE.
No. 385,002. Patented June 26, 1888.
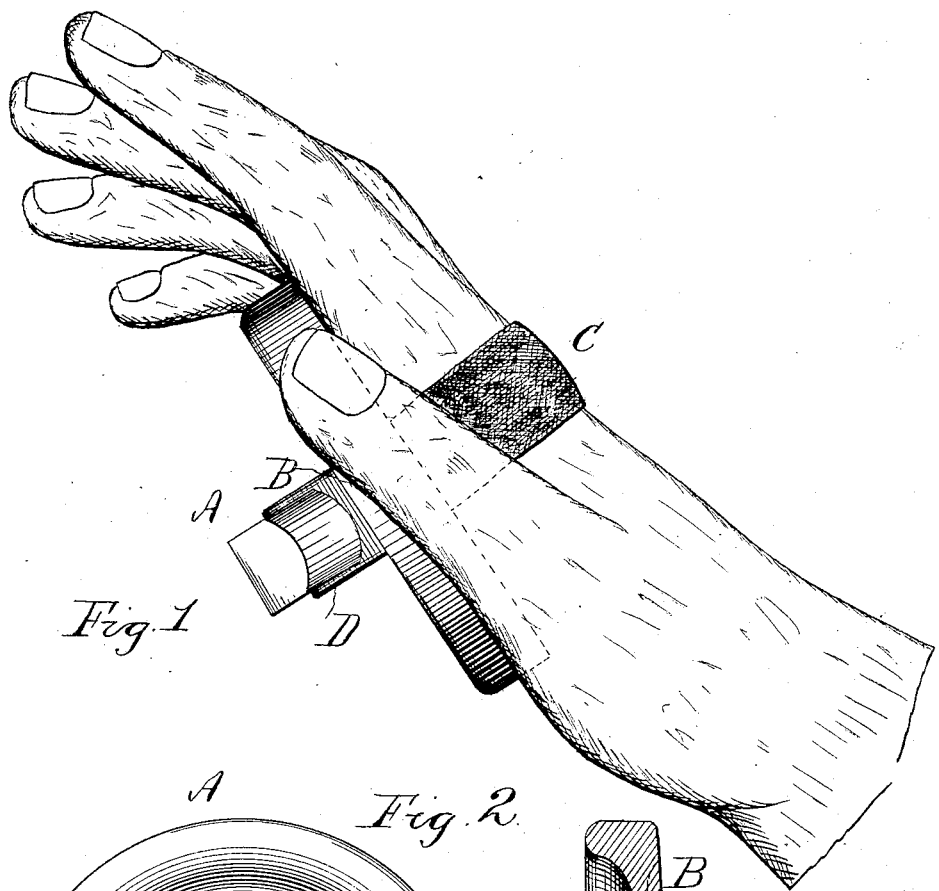
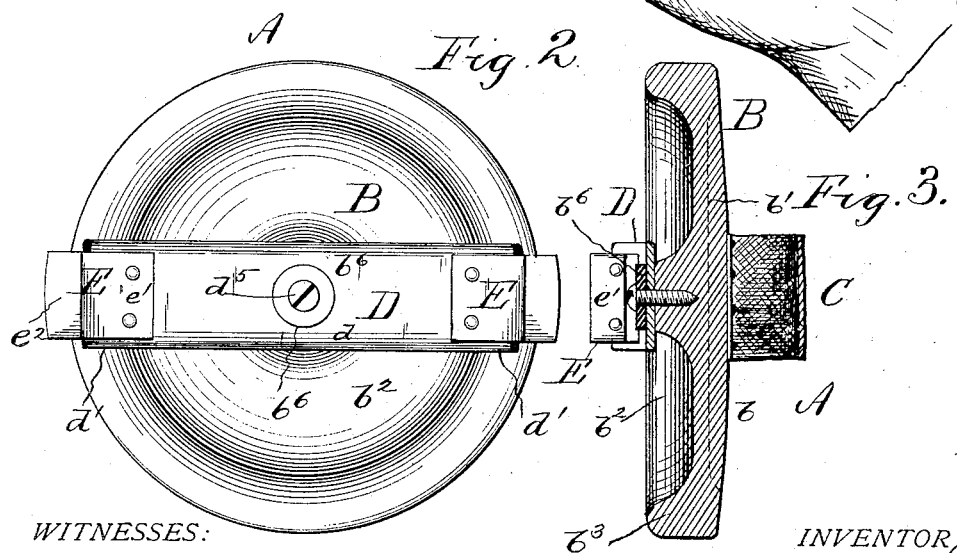
WITNESSES:
INVENTOR,
Orestes Pagan,
By S. J. Van Stavoren,
ATTORNEY.

(No Model.) 2 Sheets—Sheet 2.

O. PAGAN.
CLAPPER OR RATTLER DEVICE.

No. 385,002. Patented June 26, 1888.

WITNESSES: INVENTOR,
Orestes Pagan,
By S. J. Van Stavoren
ATTORNEY.

United States Patent Office.

ORESTES PAGÁN, OF PHILADELPHIA, PENNSYLVANIA, ASSIGNOR, BY DIRECT AND MESNE ASSIGNMENTS, OF TWO-THIRDS TO W. HARRY MATTISON, OF SAME PLACE.

CLAPPER OR RATTLER DEVICE.

SPECIFICATION forming part of Letters Patent No. 385,002, dated June 26, 1888.

Application filed October 12, 1887. Serial No. 252,179. (No model.)

*To all whom it may concern:*

Be it known that I, ORESTES PAGÁN, a citizen of the United States, residing at Philadelphia, in the county of Philadelphia and State of Pennsylvania, have invented certain new and useful Improvements in Clapper or Rattler Devices, of which the following is a specification.

My invention has relation to hand-clappers or rattling devices of the form having a plate or sounding-board and clappers attached thereto; and it has for its object to provide a simple, inexpensive, and compact form of clapper or rattler adapted to be held upon or attached to the hand and operated by a shaking movement or other suitable manipulation of the hand to produce a clapping or rattling similar to or imitating that effected by playing a pair of bones.

My invention accordingly consists of the combination, construction, and arrangement of parts comprising a disk rattler or clapper, as hereinafter described and claimed, having reference particularly to a preferably circular plate or disk having on one side a hand-band and on the other a flexible or elastic cross strap or bar fastened in its center, so as to have two opposite free ends, to which are suitably secured blocks or knobs, which, when shaken or otherwise manipulated to hit against the disk or its under outer edge, produce a rattling or clapping effect, said disk having its side adjacent or contiguous to the clappers made slightly dish-shaped or formed with a bead edge, against which the clappers strike to heighten or intensify the effect. The latter may be further intensified by the use of a sounding-box secured to the disk.

Figure 4:
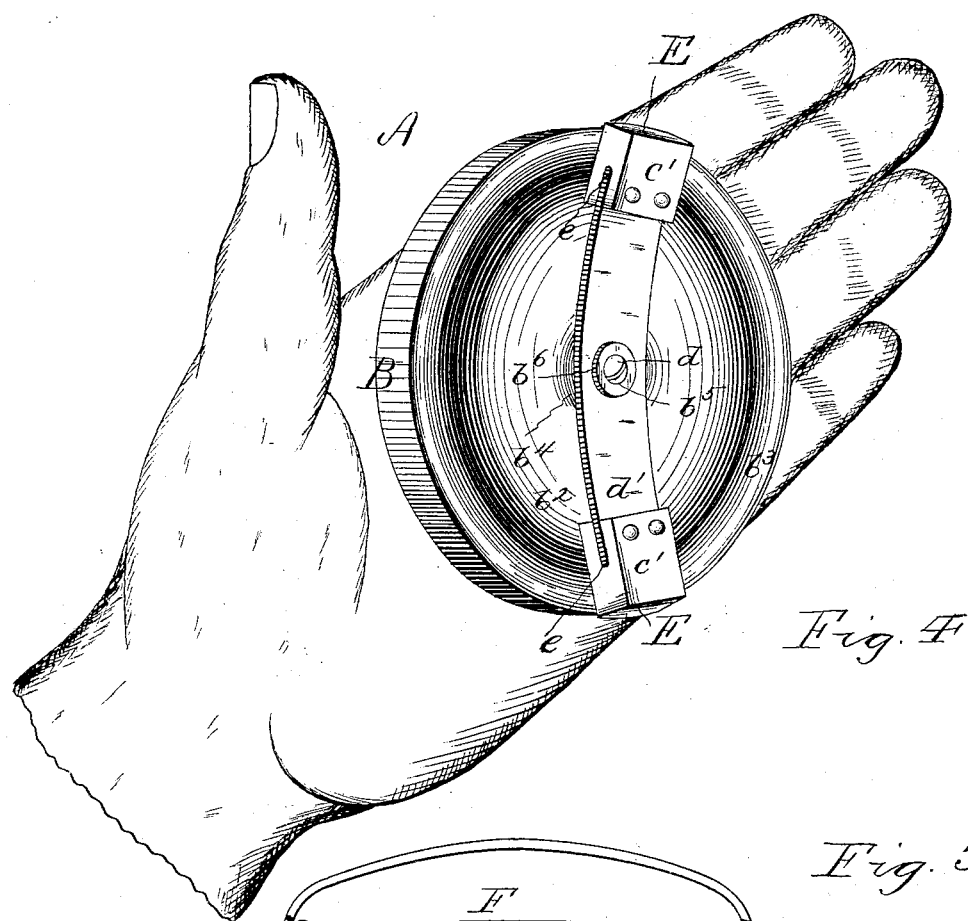

Referring to the accompanying drawings, which show a rattler or clapper embodying my improvements, Figure 1 is a perspective showing clapper and one way of affixing it to or holding the same on the hand. Fig. 4 is a like view from another point of view. Fig. 2 is a face view or elevation of clapper. Fig. 3 is a section of same, and Fig. 5 is a like view with sounding-box attached to upper side of the clapper-disk.

A represents the clapper, preferably composed of a disk, B, of hard wood or analogous material, the rear side, $b$, of which is preferably raised in the center, as indicated at $b'$, to make said side slightly rounding or cone-shaped, and the front side, $b^2$, is preferably hollowed out or made dish-shaped to form a raised center, $b^4$, and a bead edge, $b^3$. To the side $b$ or other convenient points on disk are attached the ends $c$ of a flexible band, C, for securing or holding the disk on the hand or fingers of the player.

To the front side of disk B, or to its raised center $b^4$, is riveted or otherwise suitably secured by a screw, $b^5$, and washer $b^6$ an elastic or flexible bar or band, D, which is, as shown, fastened at its middle $d$, so as to leave its ends $d'$ free, and to these ends $d'$ are fastened a clapping or rattling block, E. The latter have kerfs or slits $e$ in one side, into which the free ends $d'$ of the bar or strap D are inserted, and which are riveted to the blocks, as shown at $e'$. The sides of the blocks E striking against the disk are preferably made slightly rounding, as shown at $e^2$, to give greater or more intense effect. The blocks are preferably so arranged that they strike against the bead edge $b^3$.

Figure 5:
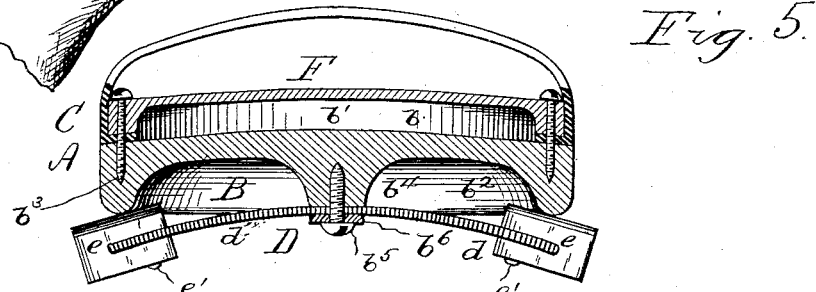

To heighten the effect of the clapping sounds, I prefer to secure to the back of the disk B a sounding-box of any desired or suitable construction, as shown at F, Fig. 5.

By allowing the palm of the hand to press upon the back of the disk, or raising it therefrom in a curved or box form, the sound of the clapping is altered, and to intensify this variation in the sound the back of the disk may be made dish-shaped, as shown or indicated by a dotted line, $z$, in Fig. 3.

From the foregoing it will be noted that the flexible bar or band D has a clapper or rattling-block at each end, and these rattling-blocks strike against the bead edge of plate, disk, or sounding-box A. As it is obvious that the form of the disk or plate A and of the rattling-blocks may be varied without departing from the spirit of my invention, I do not confine it to the specific forms or configurations shown.

What I claim is—

1. A clapper composed of a plate, A, having bead or raised edge $b^3$, and a bar, D, having clapping-blocks E at each end for striking bead or edge $b^3$, substantially as set forth.

2. A clapper composed of plate A, having bead or raised edge $b^3$, sounding-box F, and flexible bar or band D, having clapping-blocks E, substantially as set forth.

3. A clapper composed of a disk, B, having cross-bar D, with two free ends provided with clapping-blocks E, substantially as set forth.

4. The combination of disk B, having edge $b^3$, raised center $b^4$, flexible bar or strip D, and end blocks, E, substantially as set forth.

5. The combination of disk B, having band C, and flexible bar or strip D, having end blocks, E, substantially as set forth.

6. The combination of disk B, having band C and box F, and flexible strip D, having end clappers, E, substantially as set forth.

7. In a clapper, the blocks E, secured to the free ends of a flexible strip or bar, D, substantially as set forth.

8. The combination of disk B, having a sounding-box, F, in its front face and a dish-shaped rear face, and the clapper-blocks E, substantially as set forth.

In testimony whereof I affix my signature in presence of two witnesses.

ORESTES PAGÁN.

Witnesses:
S. J. VAN STAVOREN,
CHAS. F. VAN HORN.